US012107355B2

(12) United States Patent
Chen

(10) Patent No.: US 12,107,355 B2
(45) Date of Patent: Oct. 1, 2024

(54) PLUGGABLE CONNECTOR

(71) Applicant: XIAMEN GHGM INDUSTRIAL TRADE CO., LTD, Xiamen (CN)

(72) Inventor: Bingshui Chen, Xiamen (CN)

(73) Assignee: XIAMEN GHGM INDUSTRIAL TRADE CO., LTD, Xiamen (CN)

( * ) Notice: Subject to any disclaimer, the term of this patent is extended or adjusted under 35 U.S.C. 154(b) by 339 days.

(21) Appl. No.: 17/719,333

(22) Filed: Apr. 12, 2022

(65) Prior Publication Data

US 2022/0239023 A1 Jul. 28, 2022

Related U.S. Application Data

(63) Continuation of application No. PCT/CN2019/122848, filed on Dec. 4, 2019.

(30) Foreign Application Priority Data

Oct. 14, 2019 (CN) ......................... 201910973665.3

(51) Int. Cl.
*H01R 13/11* (2006.01)
*H01R 12/57* (2011.01)
(Continued)

(52) U.S. Cl.
CPC ........... *H01R 12/57* (2013.01); *H01R 12/716* (2013.01); *H01R 12/722* (2013.01); *H01R 13/05* (2013.01); *H01R 13/11* (2013.01); *H01R 13/627* (2013.01)

(58) Field of Classification Search
None
See application file for complete search history.

(56) References Cited

U.S. PATENT DOCUMENTS 4,632,475 A * 12/1986 Tomita ................... H01R 35/04 439/31
4,877,409 A * 10/1989 Tanigawa ............... H01R 35/04 439/31
(Continued)

FOREIGN PATENT DOCUMENTS

CN 203026755 U 6/2013
CN 204632931 U 9/2015
(Continued)

OTHER PUBLICATIONS

International Search Report issued in corresponding International application No. PCT/CN2019/122848, mailed Jun. 29, 2020.
(Continued)

*Primary Examiner* — Tho D Ta

(57) ABSTRACT

A pluggable connector, configured to electrically connected a first printed circuit board (PCB) and a second PCB, or configured to electrically connect the first PCB with conductive wires. The pluggable connector includes a male end and a female end. The male end includes a male housing and male plugs. The male plugs are disposed on the male housing and are soldered to a first PCB, and the male plugs extend outwards from the male housing. The female end includes a female housing and conductive clips. The female housing is engaged with the male housing. The conductive clips are disposed on the female housing, and the conductive clips are soldered to a second PCB or electrically connected to the conductive wires. A pair of clamping pieces are disposed on the conductive clips where the pair of the clamping pieces are oppositely disposed.

6 Claims, 5 Drawing Sheets

(51) Int. Cl.

| | |
|---|---|
| ***H01R 12/71*** | (2011.01) |
| ***H01R 12/72*** | (2011.01) |
| ***H01R 13/05*** | (2006.01) |
| ***H01R 13/627*** | (2006.01) |

(56) References Cited

U.S. PATENT DOCUMENTS

| | | | | |
|---|---|---|---|---|
| 6,644,980 | B2 * | 11/2003 | Kameda | H01R 12/716<br>439/83 |
| 7,802,994 | B1 * | 9/2010 | Chen | H01R 12/724<br>439/682 |
| 8,727,813 | B2 * | 5/2014 | Yang | H01R 12/732<br>439/682 |
| 2009/0191729 | A1 | 7/2009 | Kurimoto | |

FOREIGN PATENT DOCUMENTS

| | | | | |
|---|---|---|---|---|
| CN | 204905510 | U | | 12/2015 |
| CN | 106486805 | A | | 3/2017 |
| CN | 109560422 | A | | 4/2019 |
| CN | 210404103 | U | | 4/2020 |
| KR | 20020021040 | A | * | 3/2002 |
| KR | 200324392 | Y1 | * | 8/2003 |

OTHER PUBLICATIONS

Written Opinion of the International Searching Authority for No. PCT/CN2019/122848.

* cited by examiner

PLUGGABLE CONNECTOR

TECHNICAL FIELD

The present disclosure relates to a technical field of connectors, and in particular to a pluggable connector.

BACKGROUND

A connector is a device configured to detachably connect wire to wire, printed circuit board (PCB) to PCB, and PCB to wire.

At present, most connectors have a male end and a female end where the male end and female are in plug-in connection, that is, the male end and the female end of the connector are oppositely plugged. However, in prior art, when using the plug-in connector, each plug and each jack of the male end and the female end need to be plugged into a pair, so that the plug-in connection is achieved. Since each plug and each jack of the male end and the female end are disposed on an end surface, there is a visual blind area, and the plug and the jack cannot be quickly plugged into the pair. Therefore, plugging efficiency of the connector is affected, meanwhile, in a long-term use process, the male end and the female end are easy to be deformed during trying to connect with each other, which affects normal use of the connector. In view of above, the applicant provides the present disclosure after studying the prior art.

SUMMARY

The present disclosure provides a pluggable connector, which aims to solve a problem that connectors in prior art cannot be quickly plugged.

The present disclosure provides the pluggable connector, configured to electrically connect a first PCB with a second PCB, or configured to electrically connect the first PCB with conductive wires, including a male end and a female end.

The male end includes a male housing and male plugs. The male plugs are disposed on the male housing and are soldered to the first PCB, and the male plugs extend outwards from the male housing.

The female end includes a female housing and conductive clips. The female housing is engaged with the male housing. The conductive clips are disposed on the female housing, and the conductive clips are soldered to the second PCB or electrically connected to the conductive wires. A pair of clamping pieces are disposed on each of the conductive clips where the pair of the clamping pieces are oppositely disposed, and the pair of the clamping pieces are oppositely clamped to form a plug channel having an opening where the opening faces upwards. The opening of the plug channel gradually becomes larger along an upward direction. Plug openings, disposed in parallel and communicated with the respective plug channel, is disposed on the female housing.

The male housing is clamped to the female housing from top to bottom, and the male housing drives the male plugs to penetrate through the plug openings from top to bottom and plug into the respective plug channel, so that the male plugs are electrically connected to the conductive clips.

Furthermore, auxiliary soldering pins are disposed on the male end, the auxiliary soldering pins are in a geometry shape of n-shaped, and each of the auxiliary soldering pins are disposed on a side of the male housing and are soldered to the first PCB.

Furthermore, a pair of the auxiliary soldering pins are disposed on the male end, and the pair of the auxiliary soldering pins are respectively disposed on both sides of the male plugs.

Furthermore, the male plugs are in a conductive geometry shape of flat rod-shaped.

Furthermore, the clamping pieces are disposed on the conductive clips, and the clamping pieces are in a geometry shape of plate-shaped geometry where an end section of each of the clamping pieces are bent downwards. Each of the clamping pieces includes a connecting section and a bending section. The connecting section is connected to a respective one of the conductive clips. The bending section is connected to the connecting section and is bent downwards. The connecting section and the bending section form an acute angle.

Furthermore, a pair of guide pieces, extending forwards, are respectively disposed at front ends of the pair of the clamping pieces, and an opening formed between the pair of the guide pieces gradually becomes larger outwards.

Furthermore, a pair of clamping segments, extending outwards, are disposed on the male housing. Clamping grooves are defined on the clamping segments. Clamping protrusions, matched with the clamping grooves, are respectively disposed on two sides of the female housing, and the male housing is disposed on the female housing, so that the pair of the clamping segments are respectively clamped on the two sides of the female housing.

Through adopting the above technical solution, the present disclosure achieves the following technical effects:

The present disclosure provides the pluggable connector, the male end and the female end of which may be connected through a connection mode from top to bottom. Specifically, when the male end and the female end need to be connected, the male end and the female end are moved relative to each other from top to bottom, so that the male plugs penetrate through the plug openings of the female housing, and the male plugs are plugged into the respective plug channel. Since the plug channel is gradually enlarged from bottom to top, the male plugs are smoothly plugged into the respective plug channel, and the male plugs are clamped between the respective pair of the clamping pieces, so that the conductive clips and the male plugs achieve good electrical connection.

According to the solution, in a connection process of the pluggable connector, since the male end and the female end are connected from top to bottom, both the male end and the female end have a good field of view, and there is no visual blind area, which well pairs the male plugs with the plug openings and improves work efficiency. In addition, the process of engaging the male end with the female end from top to bottom is more suitable for human body operation habits.

BRIEF DESCRIPTION OF DRAWINGS

In order to more clearly illustrate technical solution of embodiments of the present disclosure, drawings required in the embodiments are briefly introduced below. It should be understood that the following drawings illustrate only certain embodiments of the present disclosure, and are therefore not to be considered as limiting a scope. For a person of ordinary skill in art, other related drawings may be obtained according to the drawings without creative efforts.

Figure 1:
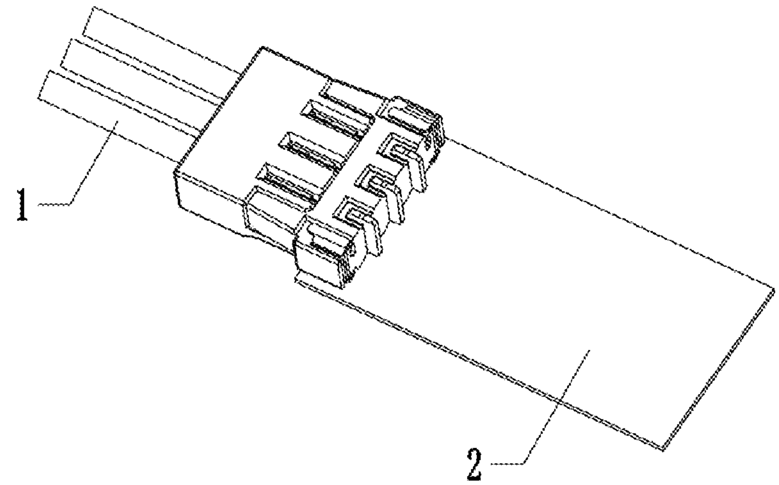
FIG. 1 is a structural schematic diagram of a shaft side of a pluggable connector according to a first embodiment of the present disclosure.

Reference number in the drawings: 1. conductive wires; 2. first PCB; 3. second PCB; 4. male end; 5. female end; 6. male housing; 7. male plugs; 8. auxiliary soldering pins; 9. conductive clips; 10. female housing; 11. plug channel; 12. clamping pieces; 13. guide pieces; 14. plug openings; 15. clamping segments; 16. clamping grooves; 17. clamping protrusions; 18. connecting section; 19. bending section.

DETAILED DESCRIPTION

In order to make objectives, technical solutions and advantages of embodiments of the present disclosure clearer, the technical solutions in the embodiments of the present disclosure are clearly and completely described below with reference to accompanying drawings in the embodiments of the present disclosure. Obviously, the described embodiments are part of the embodiments of the disclosure, and are not all of the embodiments. Therefore, following detailed description of the embodiments of the present disclosure provided in the drawings is not intended to limit a scope of the present disclosure, which is claimed, but is merely representative of the selected embodiments of the present disclosure. All other embodiments obtained by a person of ordinary skill in art based on the embodiments of the present disclosure without creative efforts shall fall within the protection scope of the present disclosure.

In the description of the present disclosure, it should be understood that orientation or positional relationship indicated through terms “center”, “longitudinal” “transverse”, “length”, “width”, “thickness”, “upper”, “lower”, “front”, “rear”, “left”, “right”, “vertical”, “horizontal”, “top”, “bottom”, “inner”, “outer”, “clockwise”, “counterclockwise”, etc. is based on the orientation or positional relationship shown in the accompanying drawings, and is merely for convenience of describing the present disclosure and simplifying the description, rather than indicating or implying that an indicated device or an indicated element has to have a specific orientation, is constructed and operated in a specific orientation, which is therefore not to be construed as limiting the present disclosure.

In addition, the terms “first” and “second” are configured for descriptive purposes only and cannot be understood as indicating or implying relative importance or implicitly indicating a number of indicated technical features. Thus, the features defined with “first” and “second” explicitly or implicitly include one or more of the features. In the description of the present disclosure, “a plurality of” means two or more, unless specifically defined otherwise.

In the present disclosure, the terms such as “mounted”, “joined”, “connected”, “fixed”, etc. should be broadly understood, for example, may be fixed connections, detachable connections, or integrated; may be mechanically connected or electrically connected; may be directly connected or indirectly connected through an intermediate medium, and may be in communication between two elements or an interaction relationship between two elements. For the person of the ordinary skill in the art, specific meanings of the above terms in the present disclosure are understood according to specific situations.

In the present disclosure, unless expressly specified and defined otherwise, the first feature “on” or “below” the second feature may include the first feature and the second feature being in direct contact, and may further include that the first feature and the second feature are not in direct contact but are in contact through additional features therebetween. Moreover, the first feature “over”, “above”, and “upper” of the second feature indicates the first feature directly above and obliquely above the second feature, or simply indicates that a level height of the first feature is higher than the level height of the second feature. The first feature “beneath”, “below”, and “lower” of the second feature indicates the first feature directly below and obliquely below the second feature, or simply indicates that the level height of the first feature is less than the level height of the second feature.

Figure 2:
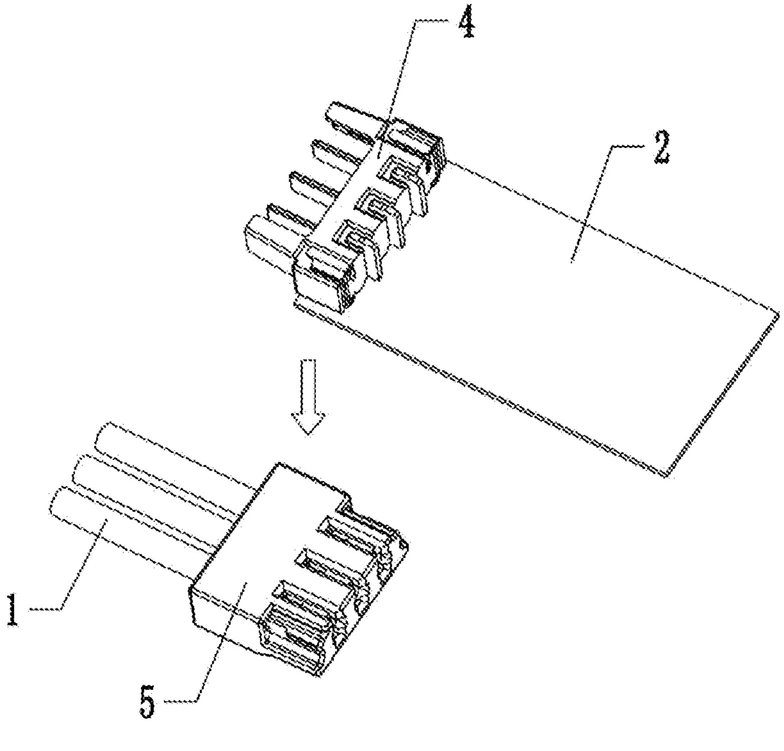
FIG. 2 is an assembly schematic diagram of a male end and a female end according to the first embodiment of the present disclosure.
Figure 3:
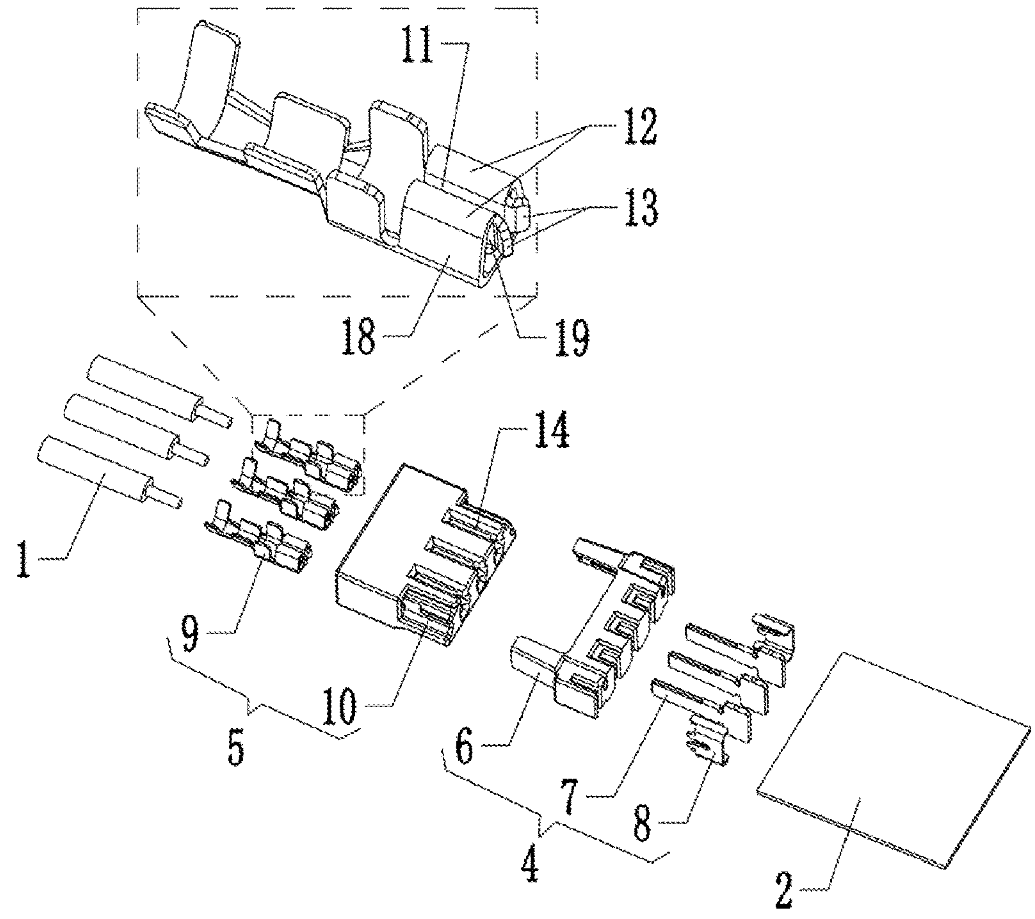
FIG. 3 is an exploded schematic diagram of the pluggable connector according to the first embodiment of the present disclosure.

The present disclosure is described in further detail below with reference to the accompanying drawings and the specific embodiments:

First embodiment (as shown in FIGS. 1-5):

As shown in FIGS. 1-3, the first embodiment provides a pluggable connector, configured to electrically connect a first PCB 2 with a second PCB 3, or configured to electrically connect the first PCB 2 with conductive wires 1, including a male end 4 and a female end 5. The male end 4 includes a male housing 6 and male plugs 7. The male plugs 7 are disposed on the male housing 6 and are soldered to the first PCB 2, and the male plugs 7 extend outwards from the male housing 6. The female end 5 includes a female housing 10 and conductive clips 9. The female housing 10 is engaged with the male housing 6. The conductive clips 9 are disposed on the female housing 10, and the conductive clips 9 are soldered to the second PCB 3 or electrically connected to the conductive wires 1. A pair of clamping pieces 12 are disposed on the conductive clips 9 where the pair of the clamping pieces 12 are oppositely disposed, and the pair of the clamping pieces 12 are oppositely clamped to form a plug channel 11 having an opening where the opening faces upwards. The opening of the plug channel 11 gradually becomes larger along an upward direction. Plug openings 14, disposed in parallel and communicated with the respective plug channel 11, is disposed on the female housing 10.

The male housing 6 is clamped to the female housing 10 from top to bottom, and the male housing 6 drives the male plugs 7 to penetrate through the plug openings 14 from top to bottom and plug into the respective plug channel 11, so that the male plugs 7 are electrically connected to the conductive clips 9.

Specifically, as shown in FIGS. 2-3, when the male end 4 and the female end 5 need to be connected, the male end 4 and the female end 5 are moved relative to each other from top to bottom, so that the male plugs 7 penetrate through the plug opening 14 of the female housing 10, and the male plugs 7 are plugged into the respective plug channel 11. Since the plug channel 11 is gradually enlarged from bottom to top, the male plugs 7 are smoothly plugged into the respective plug channel 11, and the male plugs 7 are clamped between the respective pair of the clamping pieces 12, so that the conductive clips 9 and the male plugs 7 achieve good electrical connection. In addition, as shown in FIG. 4, in the first embodiment, a portion taken off insulating layer of each of the conductive wires 1 is clamped at a respective portion of each of the conductive clips 9, and a connection structure of the conductive wire 1 and the conductive clips 9 belongs to the prior art in the technical filed, details are not described herein again.

According to the above solution, in a connection process of the pluggable connector, since the male end 4 and the female end 5 are connected from top to bottom, both the male end 4 and the female end 5 have a good field of view, and there is no visual blind area, which well pairs the male plugs 7 with the plug opening 14 and improves work efficiency. In addition, compared with the prior art, the process of engaging the male end 4 with the female end 5 from top to bottom is more suitable for human body operation habits. It should be noted that the male end 4 and the female end 5 referred by the present disclosure are only convenient to name the male end and the female end, but are not limited to shapes of the male end and the female end, and are not limited to the outer shapes of the male housing 7 and the female housing 8.

Figure 4:
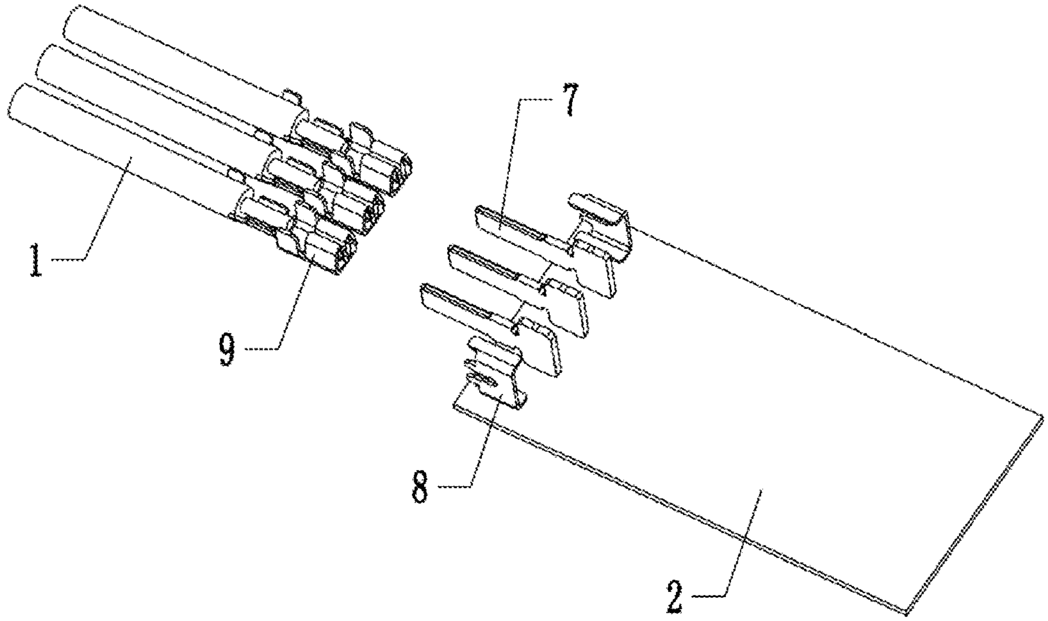
FIG. 4 is a partial exploded schematic diagram of the connector according to the first embodiment of the present disclosure where a male housing and a female housing are hidden.

In addition, as shown in FIGS. 3-4, in the first embodiment, the male plugs 7 are in a conductive geometry shape of flat rod-shaped, and the flat rod-shaped male plugs 7 are more convenient to be plugged into the respective plug channel 11. In another embodiment, the male plugs 7 may be cylindrical or other geometric shapes, and details are not described herein again.

As shown in FIG. 2 and FIG. 4, in the first embodiment, a pair of auxiliary soldering pins 8 are disposed on the male end 4, the pair of auxiliary soldering pins 8 are in a geometry shape of n-shaped geometry, and the pair of auxiliary soldering pins 8 are disposed on a side of the male housing 6 and are soldered to the first PCB 2. In the present disclosure, a plurality of male plugs 7 are disposed on the male end 4, and the pair of the auxiliary soldering pins 8 are respectively disposed on two sides of the male plugs 7. In a specific use process, the pair of the n-shaped auxiliary soldering pins 8 increase a soldering area of the auxiliary soldering pins 8 and the first PCB 2, and enhance soldering firmness of the auxiliary soldering pins 8 and the first PCB 2. In addition, assembling firmness of the auxiliary soldering pins 8 disposed on the side and the first PCB 2 is enhanced through the n-shaped auxiliary soldering pins 8. Through above arrangement, the male housing 6 is stably disposed on the first PCB 2, and the male end 4 and the first PCB 2 are formed into a whole having a stable connection.

As shown in FIG. 3, in the first embodiment, the clamping pieces 12 are disposed on the conductive clips 9, and the clamping pieces 12 are in a geometry shape of plate-shaped where an end section of each of the clamping pieces 12 is bent downwards. Each of the clamping pieces 12 includes a connecting section 18 and a bending section 19, the connecting section 18 is connected to a respective one of the conductive clips 9, the bending section 19 is connected to the connecting section 18 and is bent downwards, and the connecting section 18 and the bending section 19 form an acute angle. Through the above arrangement, since the bending section 19 and the connecting section 18 are formed by bending, the bending section 19 and the connecting section 18 have a good arc-shaped transition, so that the bending section 19 has a good reset capability. That is, when the male plugs 7 are plugged into the respective plug channel 11, the bending section 19 is pressed to bend outwards, thereby ensuring good contact between the male plugs 7 and the bending section 19. When the male plugs 7 leave the respective plug channel 11, the bending section 19 is reset to an original shape. In addition, the clamping pieces 12, composed of the connecting section 18 and the bending section 19, are very convenient to be produced in production process and structure, which have good practicability.

As shown in FIG. 3, in the first embodiment, a pair of guide pieces 13, extending forwards, are respectively disposed at front ends of the pair of the clamping pieces 12, and openings of the pair of the guide pieces 13 gradually become larger outwards. The openings of the pair of the guide pieces 13 are communicated with the plug channel 11. In the specific use process, as actual conditions are limited, the male end 4 and the female end 5 cannot be connected through moving from top to end, the pluggable connector of the present disclosure further realizes the connection of the male end 4 and the female end 5 in a plug-in manner like a connector in the prior art. Specifically, when the male end 4 and the female end 5 are paired, the male plugs 7 are plugged into the respective plug channel 11 through a gap between the respective pair of the guide pieces 13.

Figure 5:
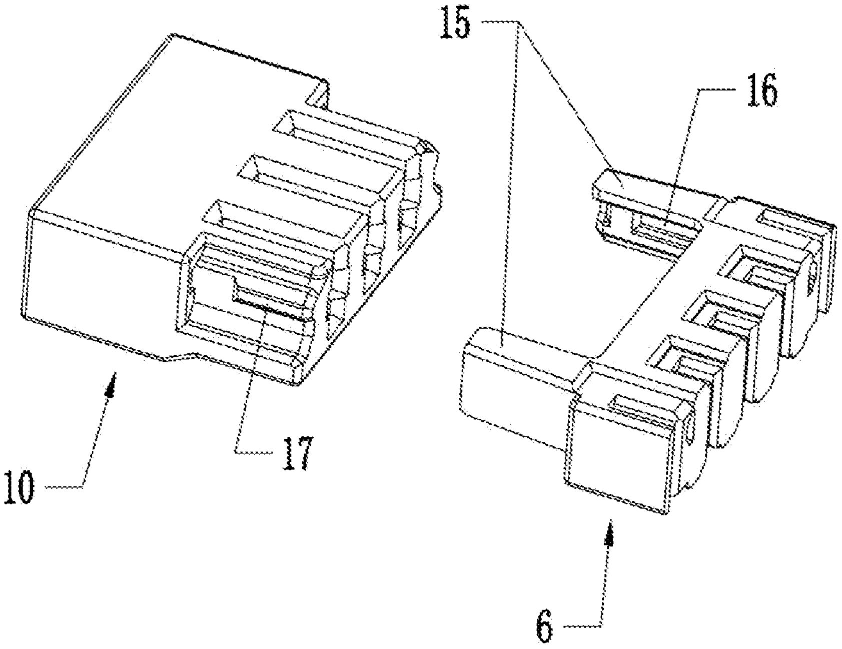
FIG. 5 is a structural schematic diagram of the male housing and the female housing according to the first embodiment of the present disclosure.
Figure 6:
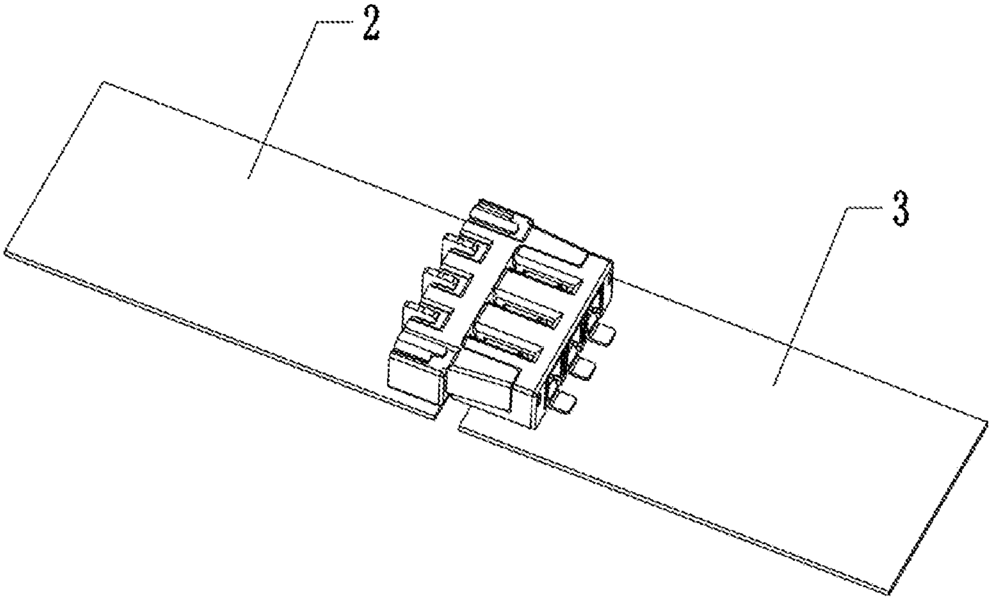
FIG. 6 is a structural schematic diagram of a shaft side of a pluggable connector according to a second embodiment of the present disclosure.
Figure 7:
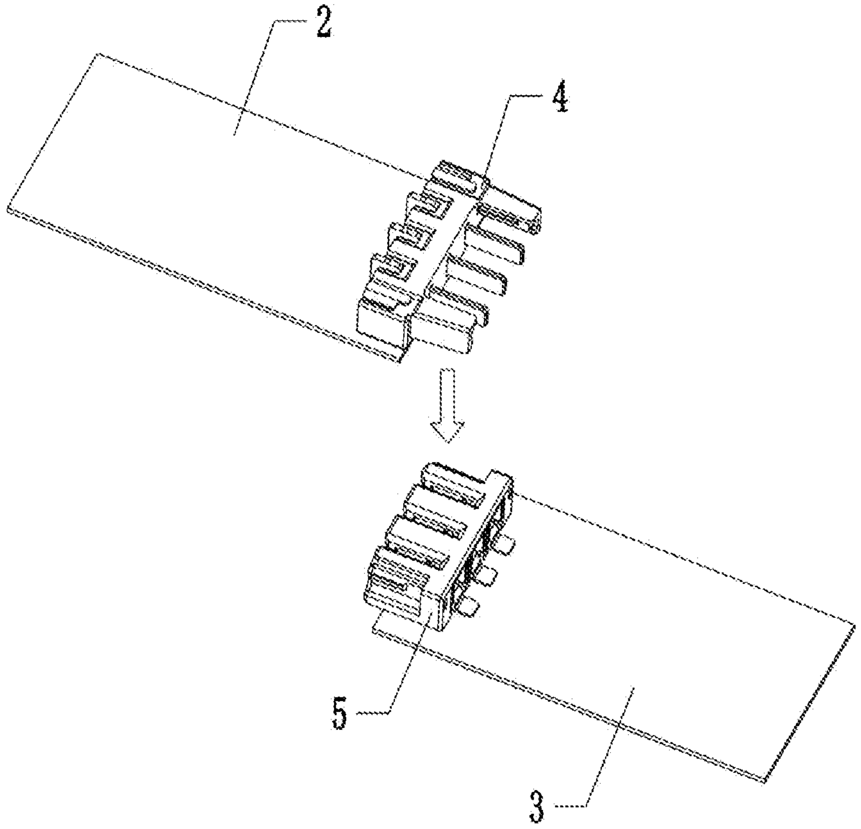
FIG. 7 is an assembly schematic diagram of a male end and a female end according to the second embodiment of the present disclosure.
Figure 8:
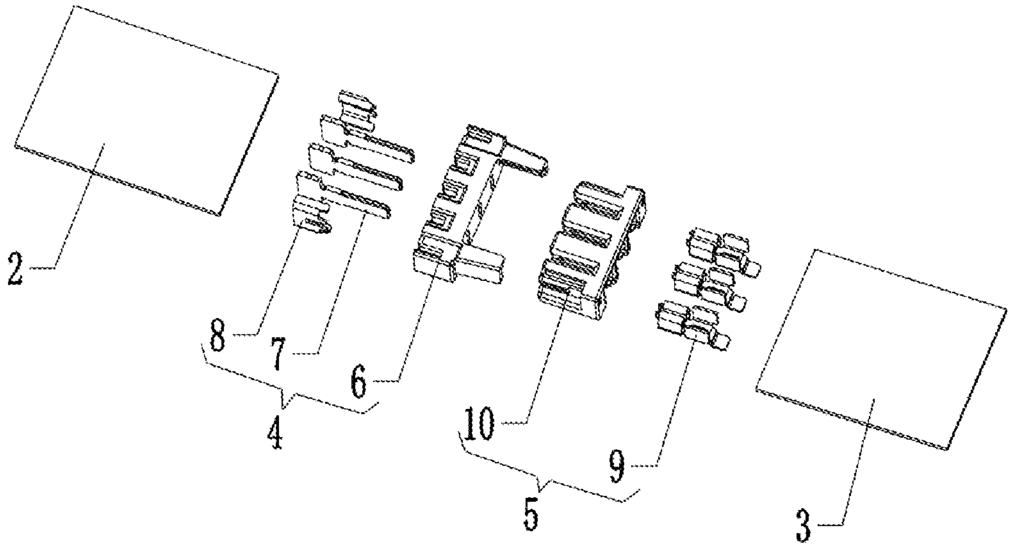
FIG. 8 is an exploded schematic diagram of the pluggable connector according to the second embodiment of the present disclosure.
Figure 9:
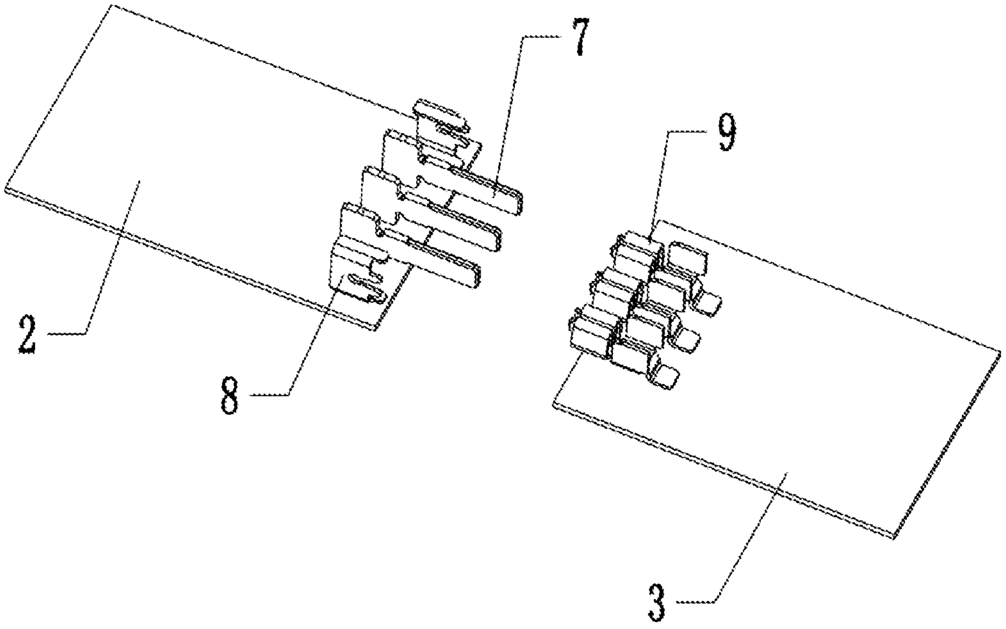
FIG. 9 is a partial exploded schematic diagram of the connector according to the second embodiment of the present disclosure where a male housing and a female housing are hidden.

As shown in FIG. 5, in the first embodiment, a pair of clamping segments 15, extending outwards, are disposed on the male housing 6. Clamping grooves 16 are defined on the clamping segments 15. Clamping protrusions 17, matched with the clamping grooves 16, are respectively disposed on both sides of the female housing 10, and the male housing 6 is disposed on the female housing 10, so that the pair of the clamping segments 15 are respectively clamped on the both sides of the female housing 10. Through the above solution, the male housing 6 and the female housing 10 achieve a stable snap-fit connection, so as to ensure the electrical connection between the male plugs 7 and the conductive clips 9.

Second embodiment (as shown in FIGS. 6-9):

As shown in FIGS. 6-9, in the second embodiment, the male end 4 of the pluggable connector is soldered to the first PCB 2, and the female end 5 is soldered to the second PCB 3. In the present disclosure, the pluggable connector is configured to electrically connect the two PCBs. Conductive clips 9 are disposed on the second PCB 3 in a soldering manner. Compared with the first embodiment, except for the conductive clips 9, remaining structures are the same as those of the first embodiment, and details are not described herein again.

According to the first embodiment and the second embodiment, the pluggable connector of the present disclosure realizes a plug-in manner from top to bottom, and further electrically connects the two PCBs or electrically connects the PCB with the conductive wires. Compared with the prior art, since the male end 4 and the female end 5 are connected in a vertical direction, the male end 4 and the female end 5 both have a good field of view, there is no visual blind area, so that an operator may better pair the male plugs 7 and the plug openings 14. In addition, the plug-in manner from top to bottom is more suitable for human body operation habits.

The above description is only the preferred embodiments of the present disclosure and is not intended to limit the present disclosure. For the person skilled in the art, the present disclosure may have various modifications and variations. Any modifications, equivalent replacements, improvements and the like made within spirit and principle of the present disclosure shall fall within the protection scope of the present disclosure.

What is claimed is:

1. A pluggable connector, configured to electrically connect a first printed circuit board (PCB) (2) and a second PCB (3), or configured to electrically connected with the first PCB (2) and conductive wires (1), comprising:

a male end (4); and a female end (5);

wherein the male end (4) comprises a male housing (6) and male plugs (7); the male plugs (7) are disposed on the male housing (6) and are soldered to the first PCB (2), the male plugs (7) extend outwards from the male housing (6);

the female end (5) comprises a female housing (10) and conductive clips (9); the female housing (10) is engaged with the male housing (6); the conductive clips (9) are disposed on the female housing (10), the conductive clips (9) are soldered to the second PCB (3) or electrically connected to the conductive wires (1); a pair of clamping pieces (12) are disposed on each of the conductive clips (9) where the pair of the clamping pieces (12) are oppositely disposed, the pair of the clamping pieces (12) are oppositely clamped to form a plug channel (11) having an opening where the opening faces upwards, the opening of the plug channel (11) gradually becomes larger along an upward direction; plug openings (14), disposed in parallel and communicated with the respective plug channel (11), is disposed on the female housing (10);

the male housing (6) is clamped to the female housing (10) from top to bottom, and the male housing (6) drives the male plugs (7) to penetrate through the plug openings (14) from top to bottom and plug into the respective plug channel (11), so that the male plugs (7) are electrically connected to the conductive clips (9); and wherein the clamping pieces (12) are disposed on the conductive clips (9), the clamping pieces (12) are in a geometry shape of plate-shaped where an end section of each of the clamping pieces (12) is bent downwards; each of the clamping pieces (12) comprises a connecting section (18) and a bending section (19), the connecting section (18) is connected to a respective one of the conductive clips (9), the bending section (19) is connected to the connecting section (18) and is bent downwards; and the connecting section (18) and the bending section (19) form an acute angle.

2. The pluggable connector according to claim 1, wherein the male plugs (7) are in a conductive geometry shape of flat rod-shaped.

3. The pluggable connector according to claim 1, wherein auxiliary soldering pins (8) are disposed on the male end (4), the auxiliary soldering pins (8) are in a geometry shape of n-shaped, and each of the auxiliary soldering pins (8) are disposed on a side of the male housing (6) and are soldered to the first PCB (2).

4. The pluggable connector according to claim 3, wherein a pair of the auxiliary soldering pins (8) are disposed on the male end (4), and the pair of the auxiliary soldering pins (8) are respectively disposed on both sides of the male plugs (7).

5. The pluggable connector according to claim 1, wherein a pair of guide pieces (13), extending forwards, are respectively disposed at front ends of the pair of the clamping pieces (12), and an opening formed between the pair of the guide pieces (13) gradually becomes larger outwards.

6. The pluggable connector according to claim 1, wherein a pair of clamping segments (15), extending outwards, are disposed on the male housing (6), clamping grooves (16) are defined on the clamping segments (15); clamping protrusions (17), matched with the clamping grooves (16), are respectively disposed on two sides of the female housing (10); and the male housing (6) is disposed on the female housing (10), so that the pair of the clamping segments (15) are respectively clamped on the two sides of the female housing (10).

* * * * *